(12) United States Patent
Chartier et al.

(10) Patent No.: US 7,176,942 B2
(45) Date of Patent: Feb. 13, 2007

(54) COLLABORATIVE DESIGN

(75) Inventors: Valentin Chartier, Boulogne (FR); Nicolas Esposito, Suresnes (FR)

(73) Assignee: Dassault Systemes, Suresnes Cedex (FR)

( * ) Notice: Subject to any disclaimer, the term of this patent is extended or adjusted under 35 U.S.C. 154(b) by 139 days.

(21) Appl. No.: 09/887,404

(22) Filed: Jun. 22, 2001

(65) Prior Publication Data

US 2002/0183878 A1 Dec. 5, 2002

Related U.S. Application Data

(63) Continuation-in-part of application No. 09/815,896, filed on Mar. 23, 2001.

(51) Int. Cl.
*G09G 5/40* (2006.01)

(52) U.S. Cl. .................................. 345/619

(58) Field of Classification Search ........ 345/619–629, 345/440–443, 184, 751, 642, 701–702, 767, 345/419, 420, 479; 716/18
See application file for complete search history.

(56) References Cited

U.S. PATENT DOCUMENTS

| | | | |
|---|---|---|---|
| 5,337,407 A * | 8/1994 | Bates et al. ................ | 345/751 |
| 5,519,627 A * | 5/1996 | Mahmood et al. ........... | 716/18 |
| 5,960,173 A * | 9/1999 | Tang et al. ................. | 709/201 |
| 5,973,678 A * | 10/1999 | Stewart et al. ............. | 345/184 |
| 6,323,863 B1 * | 11/2001 | Shinagawa et al. ......... | 345/441 |
| 6,453,328 B1 * | 9/2002 | Schaeffer et al. ........... | 715/515 |
| 6,629,065 B1 * | 9/2003 | Gadh et al. ................. | 703/1 |
| 6,912,565 B1 * | 6/2005 | Powers et al. ............... | 709/205 |

OTHER PUBLICATIONS

Micro Office 2000 Professional Edition 1999, Chapter 12, pp. 265-284.*
Coupling Application Design and user interface design. Dennis J.M.J. de Baar, 1992 ACM pp. 259-266.*
The Abstraction-link-view paradigm: Using constrains to connect user interfaces to Applications. Ralph D. Hill, 1992, pp. 335-342.*
Machine interpretation of CAD data for manufacturing applications Qiang Ji, Michael M. Marefat Sep. 1997.*
W. Keith Edwards, Flexible Conflict Detection and Management in Collaborative Applications, 1997.

(Continued)

*Primary Examiner*—Michael Razavi
*Assistant Examiner*—J. Amini
(74) *Attorney, Agent, or Firm*—Clifford Chance US LLP

(57) ABSTRACT

A method, system and apparatus for use in computer-aided design, computer-aided manufacturing, computer-aided engineering and product lifecycle management. An efficient, non-centralized communications framework makes "synchronous" collaborative design possible. Users are resident at workstations that are connected in a peer-to-peer arrangement. In a collaborative design session, the model is resident in memory at each workstation. Modifications are made at any workstation, and commands, which are interpreted at each workstation to effect the modifications, are transmitted over the network. In addition, cell descriptors may be used to identify one or more geometric cells of a model. The cell descriptors are in the form of scripts specifying constraints or filters for identifying cells. The constraints are based on characteristics of items in the model, or associations between items in a model, that are readily discernable to the user, and are therefore easily written and susceptible to easy distribution to other systems.

19 Claims, 8 Drawing Sheets

OTHER PUBLICATIONS

Saul Greenberg and David Marwood, Real Time Groupware as a Distributed System: Concurrency Control and its Effect on the Interface, 1994.

Bentley et al., Basic Support for Cooperative Work on the World Wide Web, 1997.

Dourish and Bellotti, Awareness and Coordination in Shared Work Spaces, 1991.

Greenberg and Roseman, Groupware Toolkits for Synchronous Work, 1996.

Ricardo Galli, Data Consistency Methods for Collaborative 3D Editing, 2000.

Bhola, Banavar, and Ahamad, Responsiveness and Consistency Tradeoffs in Interactive Groupware, 1998.

Bhola and Ahamad, Phase Timestamping for Replica Consistency in Interactive Collaborative Applications, 1999.

European Search Report dated Jan. 23, 2006 from corresponding application no. 02291494.9.

G. Konduri et al., "A Framework for Collaborative and Distributed for Web-Based Design," Design Automation 1999, Jun. 21, 1999, pp. 898-903.

G. Hillebrand et al., "Integration-Based Cooperation in Con-Current Engineering," Enterprise Distributed Object Computing Workshop 1998, Nov. 3, 1998, pp. 344-355.

* cited by examiner

COLLABORATIVE DESIGN

This application is a continuation-in-part of co-pending application Ser. No. 09/815,896, filed Mar. 23, 2001.

BACKGROUND

The present invention relates to the field computer-aided design (CAD), computer aided manufacturing (CAM), computer aided engineering (CAE), product lifecycle management (PLM), and product data management (PDM) systems (hereinafter "CAD" systems).

Rapid and clear exchange of ideas is of paramount importance when a design team is working on a project. However, unless members of a design team are working intimately and in close proximity, the exchange of ideas is often ineffective and incomplete. A design team may be spread across various departments within an organization, or in different geographic locations, so that team members cannot engage in a spontaneous dialogue. Increasingly, the members of a design team may be spread across different companies, in different countries, and even different industries. When a design team involves such a diversity of members, an efficient and spontaneous exchange of ideas is often non-existent.

In existing systems, ideas that underlie designs are often shared by a team in an anachronistic and time-consuming manner, such as by sketches sent by fax, or by verbal communications over the telephone. Much of the detail or rationale of a design is lost in this manner. Similarly, the intermediate steps that led to a design, including ideas that were considered but not explored, are not communicated. Thus, a member of a team in a location remote from the source of the idea may engage in a repetition of the design process that led to a design proposal, since he did not have the benefit of observing the evolution of the idea. To be more effective, some design teams may schedule periodic face-to-face meetings. However, such meetings lead to loss of productivity from travel time and costs.

Various attempts have been made to facilitate the exchange of ideas through a simultaneous design effort. For example, "asynchronous" collaborative design has been attempted, wherein a design is resident on a central server connected to several team members (clients). While this is helpful, it suffers from a number of drawbacks. Since the model is resident on the central server, all design activity ceases in the event that the server is not functioning. Also, in such a system, only one team member can modify the model at a time. Each team member must wait while a member of the team modifies the design, and each team member must wait for the server to transmit the results to each team member. The design can progress in only one direction at a time. Furthermore, the volume of data that must be transmitted is large, which slows the process substantially.

There is therefore a need for a system that allows true "synchronous" collaborative design, in which team members may work on a model simultaneously.

Known CAD/CAM/CAE/PLM systems generally include a geometric modeler, which is in charge of building and maintaining model geometry at all times. Each geometrical element of a model, that is to say each vertex, edge, face and each volume of the model, corresponds to a different cell in the geometric modeler. For example, a model of a square box would have a cell for each corner of the box (eight cells), each edge of the box (twelve cells), each face of the box (six cells), and the volume of the box (one cell). Generally, each cell has a unique identifier, and contains data defining the specific geometric feature with which it is associated.

More advanced known CAD systems build the geometry of a model from higher level specifications, called features, which are more intuitive for users and provide the user with a more flexible and more general way of defining the geometry he seeks to achieve. In such feature-based systems, a model is defined as a set of features. Examples of features are cylinders, holes, fillets on edges, or rectangular boxes.

Some feature-based CAD systems may have one or more interaction components, such as a "constraint solver". Generally, a constraint solver is a component of the CAD application that allows a user to define important functional aspects of a design, and allows the system to calculate other aspects of the design so that the crucial conditions are satisfied. To illustrate, there may be certain criteria that must be met for a model design to function properly in its environment, or to mate properly with other parts. For example, it may be absolutely necessary that two sides of an object be parallel, or that a certain side of a model have a certain length. The designer/user can specify these crucial design elements on a crude mock-up of a model, and then activate the constraint solver. The constraint solver will proceed to calculate other dimensions/criteria of the design so that the crucial conditions are met. Interaction components are so named because they interact with the feature modeler.

The geometry corresponding to a set of features is a set of cells, in which each vertex, each edge, each face and each volume corresponds to a specific cell. A model feature, depending on its character and complexity, when translated into cells, may translate into as few as no cells (as in the case of a non-geometrical feature, such as a geometrical constraint), one cell, or many geometrical cells. On the other hand, each geometrical cell may come from one or more features. In other words, two or more features of a model may have common cells. In feature-based CAD systems, the geometric modeler is usually associated with a component, sometimes called the topological journal, which keeps track of the history of topological modifications in the model, and another component, sometimes called the generic name server, discussed below.

Some features of a model can be expressed purely in terms of their geometrical characteristics. For example, a parallelepiped box can usually be characterized simply by its dimensions in an x, y, z coordinate system. Other features, however, cannot be so simply characterized. For example, a particular edge of the box referred to above cannot usually be identified purely by its geometrical characteristics. It is only by reference to the box and by additional specifications of its position on the box that the edge can be uniquely identified. Such a unique identifier of a cell containing this additional information is known as the "generic name" of the cell, and is generated by the generic name server. The generic name of a cell is stored in the model together with the cell itself.

Current generic naming schemes suffer from a lot of drawbacks. The generic names created by the system, when they can be accessed, are extremely complex to read so that it is almost impossible for all but the most experienced computer experts to read and/or write generic names. Also, they are based on system logic, which is usually quite different from the logic employed by users when envisioning models. These drawbacks make it very difficult if not impossible for users to write a script describing cells they want to act upon. This is a major disadvantage of current systems, particularly for users who want to design and modify a model by means of scripting language only. It also prevents users from using their own logic of the association between features by forcing them to rely on the associativity defined by the system's own logic. Furthermore, the generic names are not universal; they are specific to the geometric modeler and are therefore only understood by geometric modelers of the same type.

There is therefore a need for a system that would allow a user to easily identify a cell or set of cells of a model using simple and intuitive syntax, and that would provide a way for a geometric cell to be identified in a way that could be understood by different geometric modelers.

SUMMARY OF THE INVENTION

Accordingly, the present invention provides a system, method, and apparatus for providing greatly increased productivity in CAD modeling, and in particular, provides for synchronous collaborative design. The invention presents a system and method for linking the members of a design team in an architecture that allows team members to modify a model simultaneously. The system is robust in that it does not rely on a central server configuration for the processing of model changes. Changes in the model are made at each local terminal. Therefore, voluminous model data does not need to be transmitted throughout the network. Instead, only commands are transmitted over the network, which can be accomplished in much less time and with less costly hardware than if data on geometry differences were transmitted, or if the entire model is transmitted following each modification.

According to the invention, data describing a computer model being designed is stored in the memory of workstation allocated to user A. A belongs to a group of users (A, B, . . . N) who are members of a design team and who therefore would be expected to collaborate with A in the further design development of the model. Conversely, the situation may be that a new model is to be developed and one or more users in the group are expected to collaborate towards the development of the new model. Each user (B, . . . N) is equipped with a respective workstation (workstation B, . . . , workstation N) and all workstations are connected on the same computer network, which can be the Internet, an Intranet or any other type of network.

In the preferred embodiment of the invention, a group of users (workgroup) are identified as potential participants in the collaborative effort. Each user workstation is configured to have a dedicated port for connection to the network and stores the identification data of all other workstations in the group. In the preferred embodiment, all workstations have equal status and operate as both client and server during the entire design process. There are no dedicated server(s) or clients in the group. This type of organization is referred to as a "peer-to-peer" organization. With a peer-to-peer organization, the failure of a workstation, or the network connection of a workstation, will only result in that workstation leaving the session, without any impact on the collaborative effort at the other workstations.

One of the members of the collaborative group takes the initiative to share his model (an existing one or a new one) with the group. The model to be shared is the one present in the working memory of the user workstation, which may be a more recent version of an existing model stored in a storage unit of the workstation. This initiative constitutes the opening of a collaborative effort session. It is now up to the other users in the group to consult the list of proposals for model sharing and to decide whether to join that particular session.

Any user in the group that decides to join the session receives a copy of the model in its latest state of modification. This is the only time when the model itself is transmitted from one user to another. If several users are already in session when the new user joins, in the preferred embodiment, the latter may obtain a copy of the model from any one user already in session, so that, if one specific connection is broken, joining can still be effected.

Any user in the session can start working on the design by modifying the model at his workstation. Each user action is translated by the local system into a command taking into account the context in which the user action occurred. The command is executed locally so as to change the model on the local system. In parallel to the execution of the command on the local system, the command is transmitted to the other participants in the session. The exchange of commands for updating the model is fully synchronous, that is to say that workstations can send and receive data simultaneously and in real time.

When a user wishes to leave the session, she simply disconnects from the session. The model may be saved in its then current state at the user workstation and the user may continue to work independently on the model, if she so wishes.

In the preferred embodiment of the invention, all of the workstations have the same application software, which facilitates communication between workstations. However, the invention can also be practiced even if some of the software is not the same on all of the workstations, as will be discussed more fully herein. In some situations, for example when workstations have different geometric modelers, it is necessary to employ a system for identifying portions of a model on a high level, so that the commands which are transmitted over the network can be understood by disparate geometric modelers.

Thus, according to an aspect of the invention, a system and method has been developed to accomplish this high level communication. According to this aspect of the invention, "cell descriptors" are generated for some or all of the geometrical cells of a model. The cell descriptors are easily scriptable, that is to say, capable of being declared by a user in a script by using a simple and intuitive syntax. The cell descriptors serve the same function as the generic names generated by the generic name server, but have several advantages, which are disclosed herein.

The cell descriptor system of the invention consists in the definition of a set of constraints on the properties of the target cell or set of cells. The constraints relate to cell information already available in CAD systems. Five types of constraints have been defined in the preferred embodiment:

1. Constraints relative to cell dimension: a vertex would be of zero dimensions, an edge one-dimensional, a face two-dimensional and a volume three-dimensional.
2. Constraints based on the topology, that is, how the cells are arranged with respect to one another, including the concept of neighborhood.
3. Constraints based on the history of the model evolution, for example, successive creations, fusions, scissions and reuses that gave birth to the cell. Thus, for example, the user could write a script identifying the intersection of two cylinders in a model, even though the two cylinders no longer exist as such cylinders in the model. However, the intersection of the two cylinders can be derived from the data containing the history of the model evolution.

4. Constraints based on specific attributes. The attributes are of two sorts. Attributes that are defined by the specific geometric modeler being used in a system (for example attributes related to spatial positioning, such as UP, DOWN, RIGHT, LEFT, FRONT, BACK), or attributes that are attached to a feature by the user herself (such as colors, material characteristics, manufacturing properties, technological attributes . . . ).
5. Constraints based on geometrical indications. For example, such a constraint could be all faces that are visible in a given direction (i.e., along a given vector), all the spheres in a model, all planar faces, all the faces having a certain area, etc.

Each type of constraint, as well as each actual constraint, can be described in a simple and intuitive language that considerably simplifies the declaration of constraints by the average user.

In addition, according to another aspect of the invention, different types of constraints can be combined in a single constraint by means of Boolean operators.

According to another aspect of the invention, the cell descriptors are amenable to distribution, e.g., over communication networks, to other machines, even if these other machines use different geometric modelers and associated components. In the latter case, only a very simple interpreter would need to be added to the other machines' components to allow the cell descriptors to be understood as such by the other machines.

DETAILED DESCRIPTION OF THE INVENTION

Figure 1:
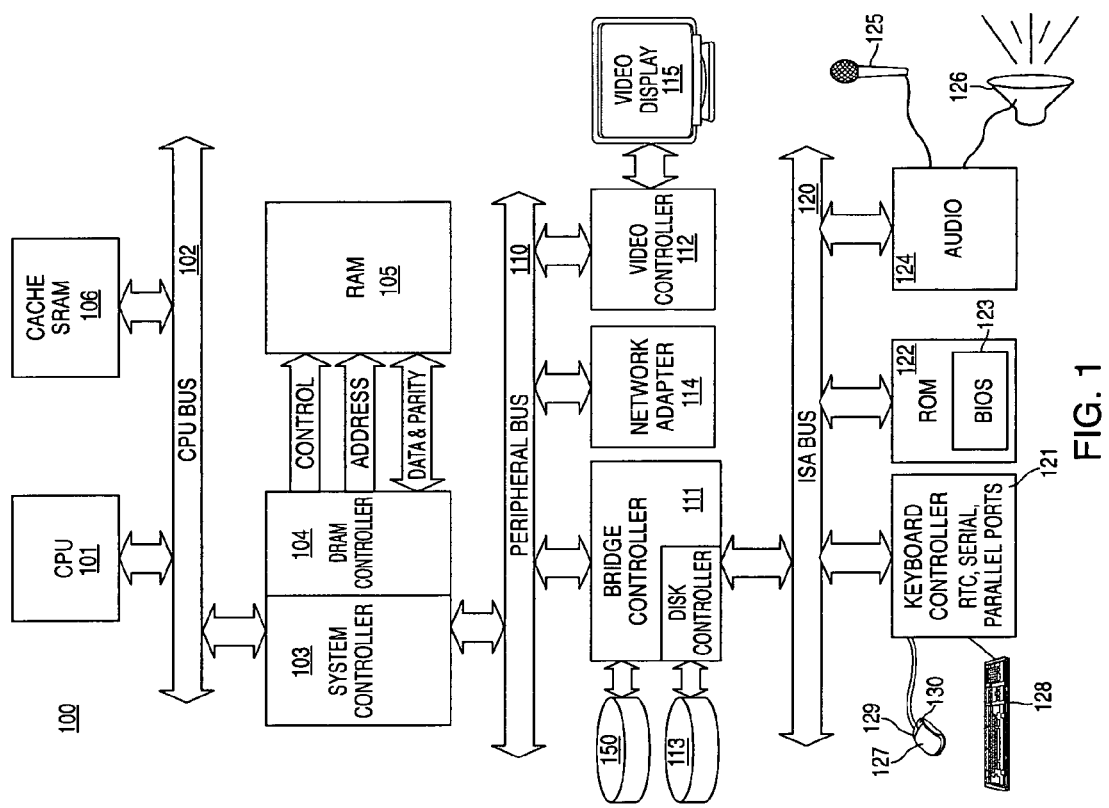
FIG. 1 is a block diagram of a computer system capable of use with the present invention, preferably as a workstation system.

Referring to FIG. 1, physical resources of a computer system 100 capable of use as a workstation in practicing the present invention are depicted. The computer 100 has a central processor 101 connected to a processor host bus 102 over which it provides data, address and control signals. The processors 101 may be any conventional general-purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 113, a video display controller 112 coupled to a video display 115, and a keyboard and mouse controller 121 can be coupled to a bus 120 and controlled by the processor 101. The computer system can include a connection to a computer system network, an intranet or an internet. Data and information may be sent and received over such a connection.

The computer 100 can also include nonvolatile ROM memory 122 to store basic computer software routines. ROM 122 may include alterable memory, such as EEPROM (Electronically Erasable Programmable Read Only Memory), to store configuration data. BIOS routines 123 can be included in ROM 122 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, Windows 2000™, UNIX, LINUX, the Apple MacOS™ operating system, or other operating system.

An operating system may be fully loaded in the RAM memory 105 or may include portions in RAM memory 105, disk drive storage 113, or storage at a network location. The operating system can provide functionality to execute software applications, software systems and tools of software systems. Software functionality can access the video display controller 112 and other resources of the computer system 100 to provide models of objects on the video computer display 115.

Collaborative Design

A computer such as the computer of FIG. 1 could be used as a workstation for each of the users of the present invention. As discussed herein, each workstation is connected to the other workstations through a network, such as the Internet or an Intranet, which allows decentralized communications between the workstations.

Figure 2:
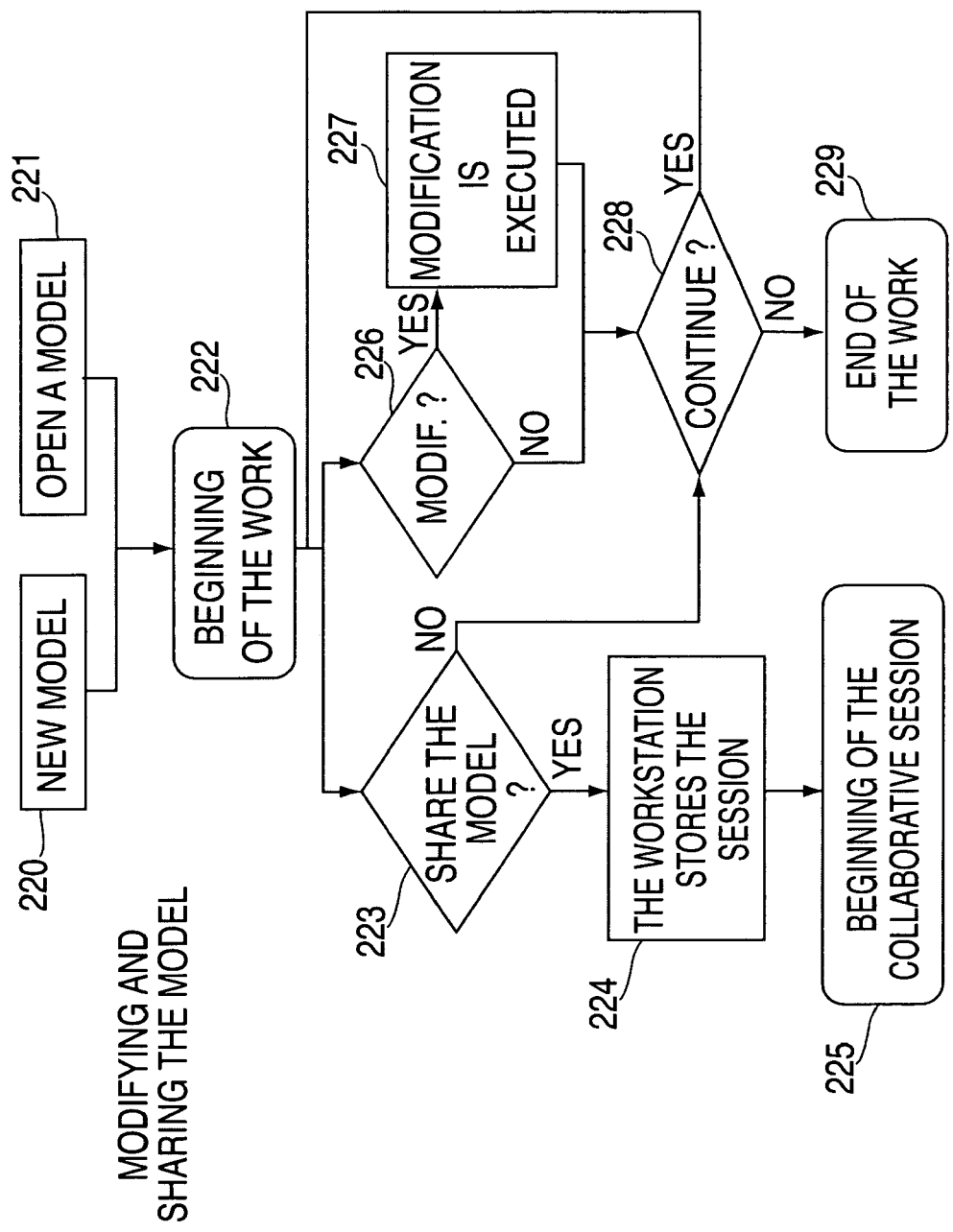
FIG. 2 is a flow chart illustrating representative operations of a user of the present invention who wishes to share or modify a model.

FIG. 2 illustrates a method that would be employed by a user of the system in the preferred embodiment. The user either creates a new model 220 or opens an existing model

221, either of which then becomes the subject of the user's activities. In the event 226 that the user wishes to modify the model, the user issues one or more commands that are then executed 227, changing the model. The user then has the option 228 of terminating the session 229, or continuing to modify the model. At any time a user may also decide to share the model 223. Should the user wish to share the model the session is stored with the present configuration of the model 224, and a collaborative session can begin 225. The user may continue to modify the model at his local workstation, while at the same time sharing the model. This aspect of the method allows for true collaborative design. In the event that a user continues to modify a model after beginning a collaborative design session, his commands are executed locally to modify the model at his workstation, and in addition, the commands are sent to other users in the session, as discussed more fully below.

Figure 3:
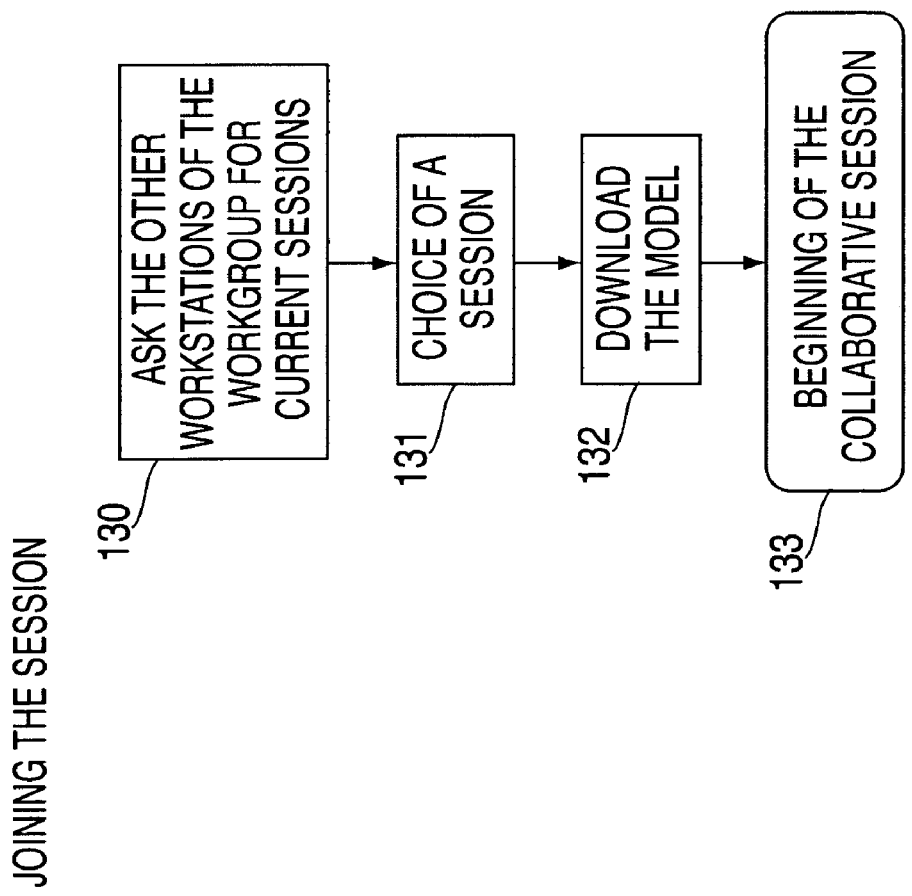
FIG. 3 is a flow chart illustrating representative operations of a user of the present invention who wishes to join a collaborative session.

FIG. 3 illustrates steps that would be taken by a user who wishes to join a collaborative design session. The user queries the other workstations of the workgroup to see if any sessions are ongoing 130. The user then chooses the session he wishes to join 131, and the model of the session is downloaded into the user's workstation 132. As stated, this is the only time that the entire model is transmitted over the network. In the preferred embodiment, since the model resides on the workstation of each user who is involved in the current collaboration, the model can be downloaded from any active user.

Figure 4:
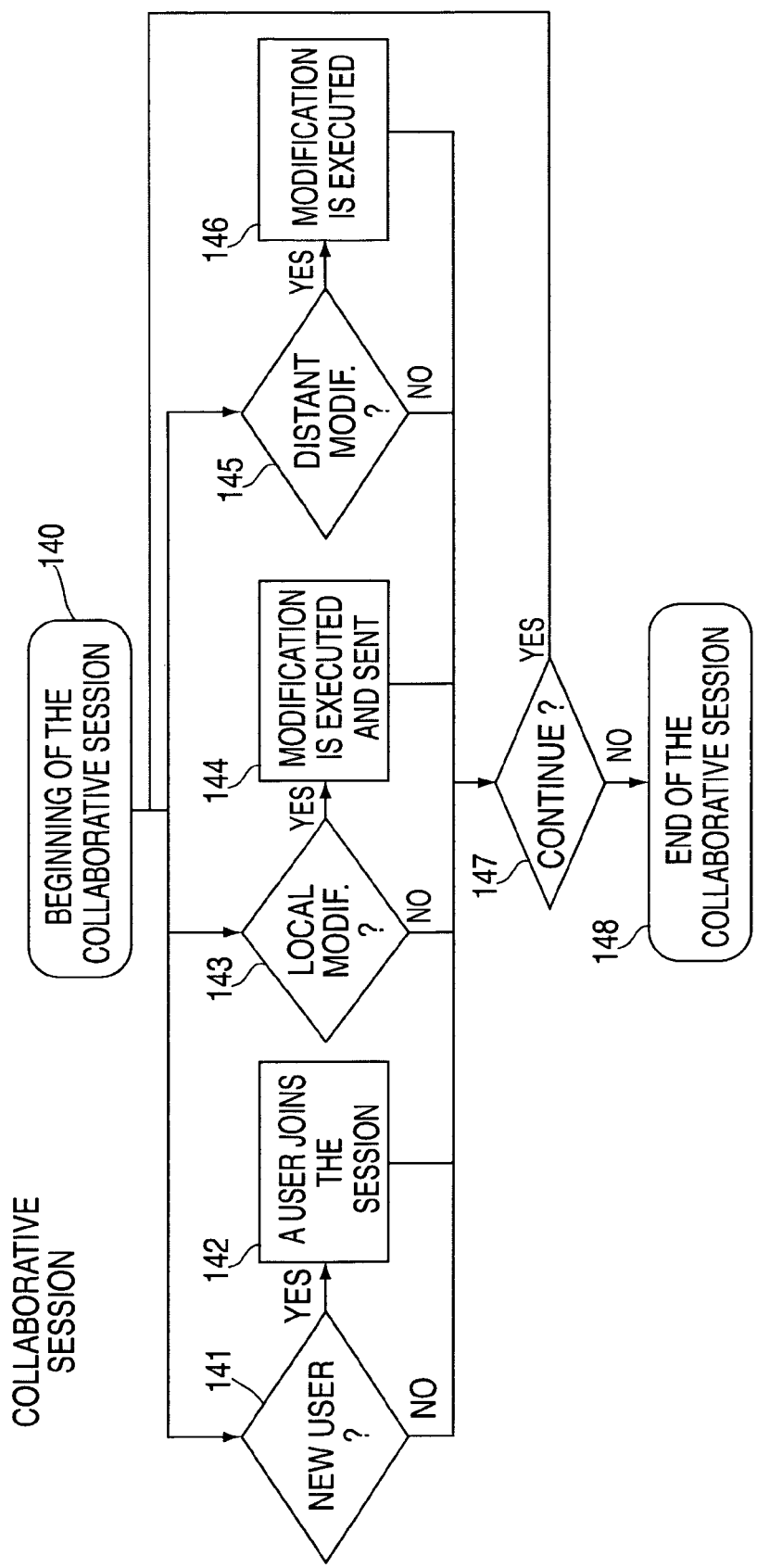
FIG. 4 is a flow chart illustrating representative operation of the system of the present invention during a collaborative session.

FIG. 4 illustrates the operations of a collaborative session. During a collaborative session, the system is poised to accept a new user at any time 141. When a user joins a session 142, the user is provided with the current version of the model. In addition, each workstation is poised to accept and execute local commands from the local user to modify the model 143. Whenever such a local modification is made 144, the commands are also transmitted to all of the users. Each workstation also is poised to receive and execute commands at any time from any of the users in the collaborative session 145. When such a command is received, the local workstation executes the command and modifies the model locally 146.

In one embodiment of the invention, users can be in communication by phone or e-mail, discussing the model and the change the user intends. The advocate of a change can then make the proposed change at her workstation, which is then transmitted simultaneously to the other users in the collaborative session. The changes are made at each workstation nearly simultaneously, allowing each user to see immediately exactly what the advocate had proposed, which allows the creative process to proceed unhindered. This is a vast improvement over existing methods wherein a change communicated orally must be envisioned in the mind of each designer in the workgroup, likely leading to a different model configuration in the mind of each of the designers in the workgroup.

In the preferred embodiment, commands are executed locally as a sequence of feature events, that is, a succession of read/write operations on the model. The sequence of feature events constitutes a transaction, which is logged in a transaction journal. The transaction journal may also include other information, such as events that do not relate to the model or events that describe the command in high-level terms.

In the preferred embodiment of the present invention, three principal types of commands are distributed over the network, i.e., "instantiate" commands, which are commands used to create new features, "set" commands, which modify features, and "own" commands, which move a feature, including moving it to the trash bin (deleting a feature). In the preferred embodiment, a command is comprised of two parts: the order (its name) and the arguments, if any. The arguments of a command include the context, e.g., the object(s) selected by the user and to which the command applies and any other information required to render the command executable. It should be understood that the types and formats of commands that can be sent over the network can vary widely and are all within the scope of the invention.

Figure 5:
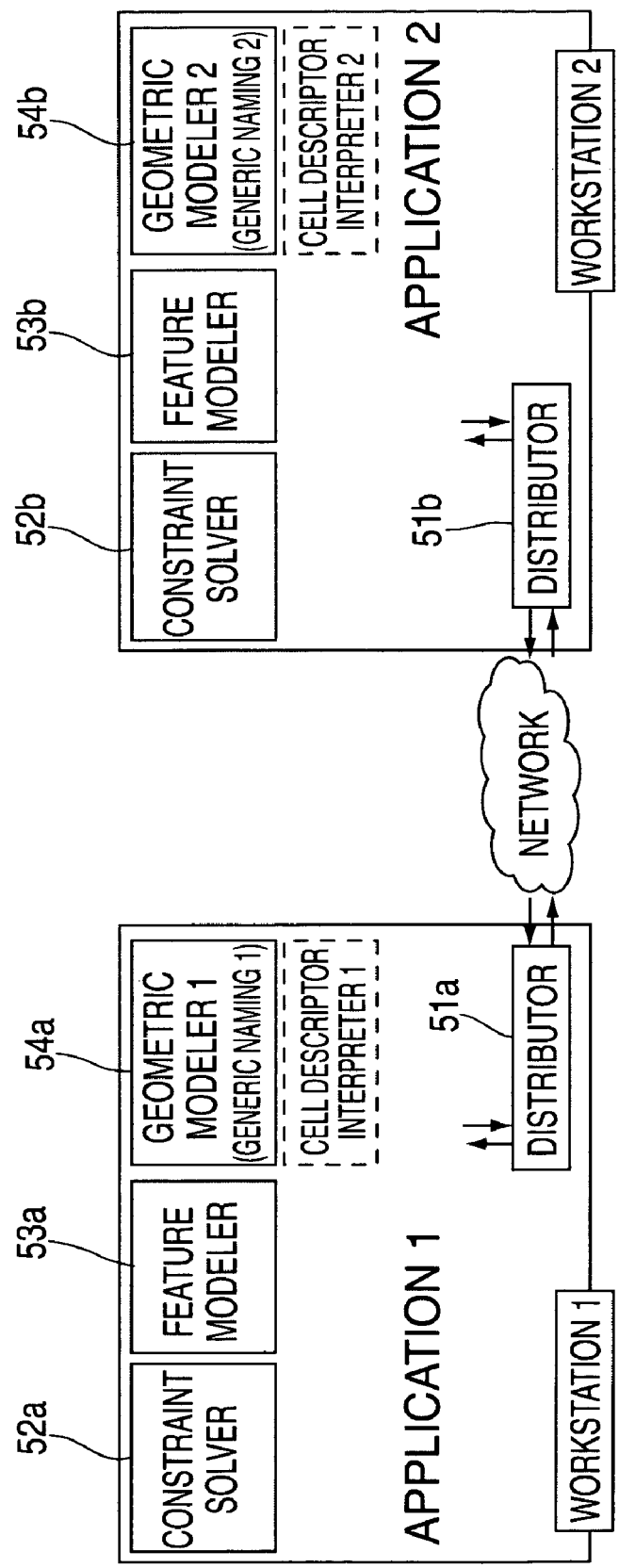
FIG. 5 is a schematic illustration of a system needed to achieve collaborative design in accordance with the present invention.

A further aspect of the invention is described with reference to FIG. 5, which is a schematic representation of two workstations connected via a network. In order for collaboration to occur according to the present invention, the distributor component (51a, 51b), the feature modeler (53a, 53b), and any associated interaction component(s) (52a, 52b) (in this example, a constraint solver), if present, must be identical. The applications, however, do not need to be the same. For example, the application may be a CAD system on workstation 1, and a virtual product data management system on workstation 2.

We now focus on the geometric modelers (54a, 54b). In the preferred embodiment, the command(s) that are transmitted over the network manage feature(s). The features include generic name(s), which identify the cell(s) that will be used for reconstructing the model needed by the execution of the command. If the geometric modelers are the same in workstation 1 and workstation 2, then collaboration is possible under the present invention, provided that the generic modelers use "persistent generic naming". "Persistent" generic naming refers to an aspect of some geometric modelers wherein once the generic name server assigns a generic name to a cell, that particular name is thereafter always used to refer to the cell. The generic name does not change when the model is modified if persistent generic naming is used. This is the case even if the cell ceases to be a part of the model, which may occur, for example, if the model is changed in such a way as to eliminate the cell. When persistent generic naming is used, there is no confusion at a workstation when a command is received. The command can be executed without need for translation since the generic names of all of the cells of the model are the same on both workstations. In the preferred embodiment of the invention, all of the workstations have the same geometric modeler and the geometric modeler uses persistent generic naming.

However, not all geometric modelers use persistent generic naming. Some geometric modelers assign a new name to each of the cells of a model each time a change is made; other geometric modelers use generic names which depend on the state of the geometric modeler at a given time. If a workstation is equipped with a geometric modeler that does not use persistent generic naming, then when a command is received containing a generic name, there might be confusion. The transmitted generic name may be indecipherable at the receiving workstation, particularly if the model has been modified so that it is not in the same state as the model at the originating workstation. In that case, there is a need for a higher-level method of identifying cells of a model so that the command can be understood at the receiving workstation. The higher-level method of identifying cells is provided through use of "cell descriptors" which will be described fully below.

Similarly, if the geometric modelers are different between workstations, cell descriptors must be used. In the event that cell descriptors are used, each workstation must be equipped with the same cell descriptor interpreter, described below.

Note that even if one application does not use a geometric modeler, collaborative design can still be possible since the distributor component works on the feature modeler level. This situation might arise, for example, if a user is running an application (such as a PDM cost control system that focuses on the parts of a model and the costs of those parts) that does not graphically display a representation of the model to the user. In that case the user workstation does not need to be equipped with a geometric modeler, and collaboration is possible.

Cell Descriptor

Figure 6:
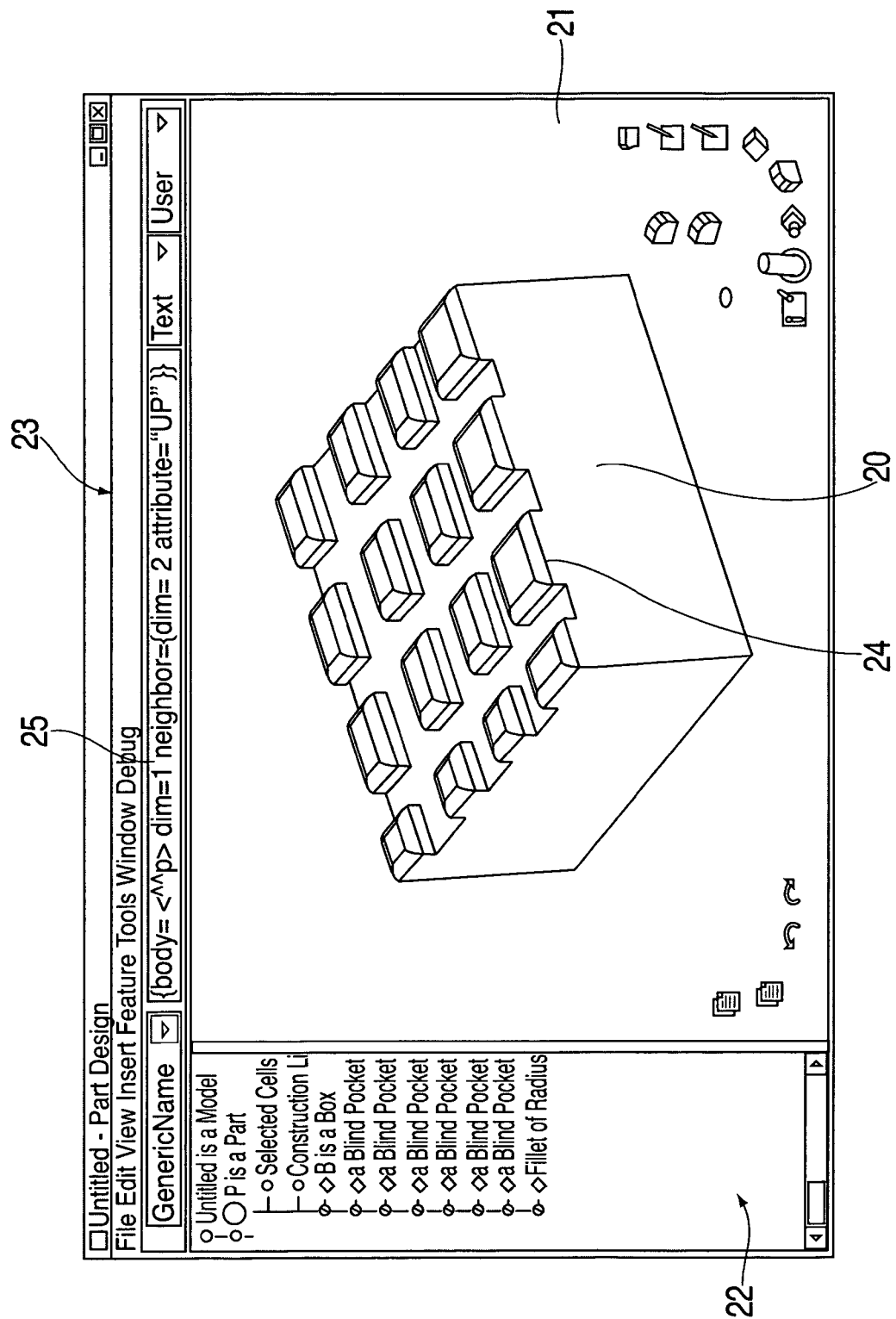
FIG. 6 is an example of a CAD system display of a model showing a cell descriptor script input according to the present invention.

A detailed description of the cell descriptor is provided by referring to the example shown in FIG. 6. In FIG. 6, a model is shown on a CAD system display. The model 20, resembling a waffle iron, is displayed such that two of the side faces and the upper surface are visible. In this particular example, the display is separated into a model display portion on the right 21, a feature tree portion on the left 22, and menu toolbars 23 along the top of the display. It is to be understood that the configuration of the display can be varied in many ways, which are evident to a person of skill in the art.

In this particular example, the user wishes to place a fillet on all of the edges of the raised portions of the upper surface, a representative one of which is designated by reference number 24. In fact, FIG. 6 shows the model with the fillets already in place, for ease of illustration. As is readily discernable from FIG. 6, the number of edges onto which a fillet is to be placed is rather large (i.e., 64 edges). Under existing systems, each edge would have to be separately designated to be identified as the context of a fillet command. This could be done in existing systems, for example, by placing a cursor over each edge and clicking a mouse while holding the Ctrl key. However, with the present invention, all of the desired edges can be identified with one script, which is written by the user using a simple and intuitive syntax. Thus, in the preferred embodiment, all the desired edges can be identified and acted upon with only two user interactions.

Thus, in the example, the user commences a fillet command by selecting any edge of the model and designating that a fillet is to be placed on the edge. In practice, the user would select an edge that is easily selectable in the display, such as edge 24; however, the user may select any edge to commence the command. When this is done, the user can then designate the edge or edges onto which he wishes the system to place a fillet by writing a cell descriptor script. In the present example, the user types the cell descriptor in the area on the display 25 designated for this purpose. In this example, the user would write the following representative script:

"{body=<^^P>dim=1 neighbor={dim=2 attribute="UP"}}"

The script means that from the part (body=<^^P>), we select the edges (dim=1) that are connected to (neighbor) faces (dim=2) that carry the "UP" attribute (attribute="UP").

Thus the system is instructed to add fillets to each edge that matches the given cell descriptor. The system will run the script and return a list of cells that match the script. The fillet command is then performed on each of the cells in the list.

The example illustrates the vast improvement in productivity that is achieved with the present invention. Rather than having to pick each desired edge one by one, and perform a fillet command on each edge, the user need only designate one fillet command, and write a simple script to identify all of the desired edges. It will be understood by a person of ordinary skill in the art that the particular syntax used in writing the script can vary, provided that the script conveys the presence of one or more of the constraints discussed above.

Another example is provided that demonstrates the power of the tool provided by the present invention. Focusing again on FIG. 6, we can see from the feature tree that the model consists of a box to which six "blind pockets" have been applied along the top face. Three of the blind pockets run parallel to one side of the box, and the other three run perpendicular to the first three blind pockets. This creates the "waffle iron" or "chocolate bar" pattern on the top face of the box. Suppose that the user wishes to add fillets only to the outside edges of the face with the waffle iron surface. There are sixteen such edges (four per side) that were created when the blind pockets were added. These sixteen edges are the remaining portion of the original four edges that existed along the top face of the box prior to the addition of the blind pockets. As such, they can be defined using the history data for the model. After having commenced a fillet command, the user then would write a script specifying that the edges to which the fillets should be added are those edges that were connected to the upper face of the box prior to the addition of the blind pockets. The script would read:

"{body=<^^P>dim=1 from={body=^B dim=1} neighbor=|dim=2 attribute="UP"}}"

The script means that from the part (body=<^^P>), we select the edges (dim=1) that come from the B box edges (from={body=B̂ dim=1 }) that are connected to (neighbor) faces (dim=2) that carry the "UP" attribute (attribute="UP").

In the foregoing example, the user is able, with one script, to designate sixteen edges using information that is not directly in the model itself, but is found in history data. This greatly facilitates the design process. It can be seen that through various combinations of the constraints described above, the user will be able to select any portion of the model he desires with relative ease.

It is further seen that the vast improvement in productivity is achieved partly as a result of the fact that the cell descriptor is composed by using constraints that are readily understandable, and that relate directly to the user's logic. The general process by which the system understands and applies the cell descriptor is now described. Focusing on FIG. 7, a schematic representation of the cell descriptor processing system is shown. When a user wishes to target a cell or a set of cells, he declares in a cell descriptor script 30 the constraint or the sequence of constraints that define the target, as described above. The system, starting with the first declared constraint, goes through the whole set of cells in the model to retain only those cells which meet the constraint. If more than one constraint is declared, the system applies the next constraint to the subset of cells retained at the previous level. This "filtering" process ends when all constraints have been applied. The set of constraints that could be applied 32 are the constraints discussed above relating to dimension, neighborhood, history, attributes and geometry. The arrows in FIG. 7 between the interpreter and the CAD system signify the exchange of codes from the interpreter to the appropriate portion of the system. The interpreter determines, based on the filters in the cell descriptor, which portion of the system to access to obtain the desired cell information. The set of cells available at the end of the process 33 are those which meet all the criteria set by the user in the cell descriptor. The corresponding cells can then be acted upon according to a user-defined command.

Figure 7:
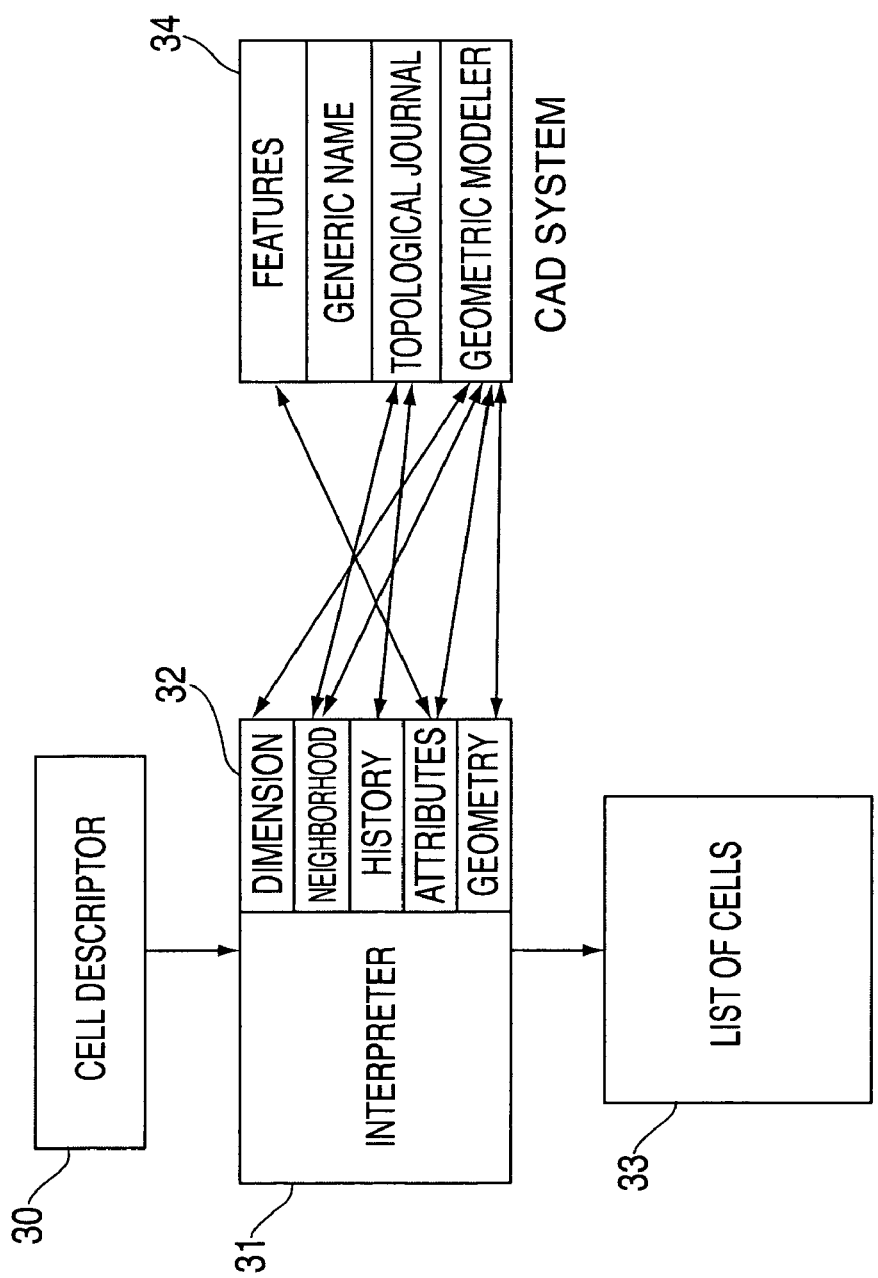
FIG. 7 is a schematic diagram showing the progression from cell descriptor to a list of cells, according to the present invention.

In FIG. 7, an interpreter 31 is shown interfacing with the geometric modeler 34 to obtain a list of cells. The interpreter deciphers the syntax of the cell descriptor and determines, for each filter, the portion(s) of the CAD system that must be accessed to obtain a list of cells meeting the constraints of the filter. In the event that the cell descriptor script is being processed by a system that uses a geometric modeler different from the system in which the cell descriptor originated, then the interpreter also serves the function of determining for the specific geometric modeler being used those portion(s) of the modeler that must be accessed to obtain a list of cells meeting the constraints of the cell descriptor. The cell descriptor of the present invention is general enough to accommodate all CAD systems. The resulting list of cells generated is the same, regardless of the system used.

Figure 8:
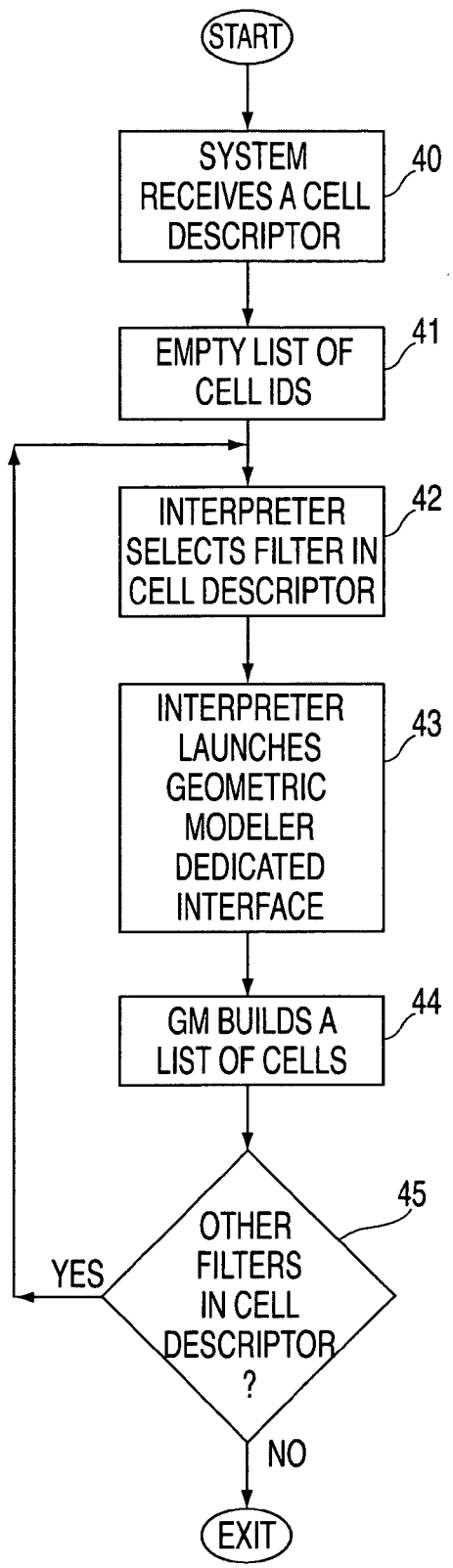
FIG. 8 is a table that graphically displays the steps taken by the system of the present invention to create a list of cells in accordance with the cell descriptor of the present invention.

Referring to FIG. 8, the general process by which the system understands and applies the cell descriptor is shown. The process of the invention begins when the system receives a cell descriptor (40). As discussed, the cell descriptor may have been generated by the user locally, or may have been received by the system through a communications network from another user or system. A list for storing the identification of cells ("cell ID") is reset (41), and the interpreter selects the first filter in the cell descriptor script (42). The interpreter then launches an algorithm asking the geometric modeler for a list of cell ids that meet the requirement of the first filter or constraint (43). In response, the geometric modeler builds a list of cell IDs that meet the constraint (44), which is stored in the list of cell IDs. The system then determines whether any other filters are in the cell descriptor (45). If so, the process is repeated for the next filter using the subset of cells identified in the previous level as a starting point. The cell IDs of such cells are stored, and the process repeats until all of the filters in the cell descriptor have been applied, and a final list of cell IDs is stored.

The present invention also provides for vast improvements in productivity by its facilitation of the use of "macros". Macros are macro-commands that allow a user to tie several actions together and then activate the actions with one step. In a CAD/CAM/CAE/PLM application, the user can assemble in a macro a series of commands that he wishes to use repeatedly during a design process. For example, a user may wish to add a surface finish to each face of an object that faces "up", and in addition, specify a color for such faces. The user could create a macro adding a color to each selected face, and specifying a surface finish for each face. The user would then individually select in serial fashion the "up" faces, and run the macro on each face.

It would be of great utility to be able to write macros that also select the desired portion of the part (faces facing "up" in the example) upon which the action is to be taken. This is not possible in existing systems because the generic name for each face is unique, as discussed above, and is therefore not amenable to use in a macro. However, using the cell descriptor of the present invention, it is possible to specify such cells as part of the macro. This aspect of the invention is a powerful tool for increasing productivity. Such macros could not only be transferable from face to face in a given object, but could be transferable to different objects. In fact, a macro of the sort described could even be transferred to a different CAD system, provided it is written in software-independent language, and the transferee system is equipped with an interpreter for deciphering the cell descriptor.

In another aspect of the invention, cell descriptors provide a vehicle for the introduction of design concepts based on the user's (or an enterprise's) knowledge. For example, above was discussed the case of adding a fillet to "all the external edges" of the "waffle iron" model of FIG. 6. However, through the introduction of knowledge-based constraints, the user could select, using a cell descriptor, "all dangerous edges" of the object. The user need only define, or import from another source, the definition of a dangerous edge (for example, edges having a chamfer radius below a specified minimum). The definition of "dangerous" would be found in a macro.

The foregoing is an example of the use of knowledge-based constraints being used to find cells in a model in its existing state, or "static state". Using the cell descriptor of the present invention, a user also could specify cells "dynamically", that is, the cell descriptor would specify a value for a parameter of a cell that is not fixed in the model, but is calculated during the interpretation of the cell descriptor. As an example, consider the case where a device, such as a robot, is positioned within a work cell, and the user desires to know what cell of the model (the robot) will collide with an adjacent object in the work cell when the robot is swung through an arc. The cell descriptor of the present invention could be written to access existing functionality of the CAD system to find the desired cells.

In a further aspect of the invention, the cell descriptor method of the present invention can be used to create "generative scripts", i.e., a purely textual description of an object. For example, referring to FIG. 6, the "waffle iron" model can be created using only a scripting language using the following text as a representative example:

```
MyModel isa Model
{
components:
    P isa Part
    {
    components:
        B isa Box
        {
        properties:
            Height = 60.0
            Width = 100.0
            Depth = 100.0
        }
        Pocket1 isa Pocket
        {
        properties:
            Height = 10.0
            Width = 10.0
            Depth = 100.0
            X = 30.0
            Y = 0.0
            Z = 30.0
        }
        Pocket2 isa Blind Pocket ...
        Pocket3 isa Blind Pocket ...
        Pocket4 isa Blind Pocket ...
        Pocket5 isa Blind Pocket ...
        Pocket6 isa Blind Pocket ...
    }
}
```

In the foregoing example, the model is defined as being composed of a part "P", which is, in turn, composed of a box "B", and six blind pockets. The basic shape of the waffle iron part P is box B, with the specified height, width and depth dimensions (properties). The box is thus created and placed at the specified location in a three dimensional (x,y,z) coordinate system. The waffle iron pattern on the top face of the box is made by adding six "blind pockets" to the box, as discussed above. The six blind pockets are defined by specifying the height, width and depth of the blind pocket, and specifying where in the x,y,z coordinate system the blind pockets would be placed so as to change the shape of the top face of the box. The blind pockets each create a void in the part, which ultimately yields the waffle iron configuration in the top of the box. In the example script above, only the first blind pocket is defined. The second through sixth blind pockets are defined in a similar manner, but with different x,y,z coordinates. As the box is built, the CAD system creates a generic name for each geometric cell of the model.

Having created the basic shape of the model with the foregoing script, the user would then need to put fillets on the edges of the waffle iron pattern, as depicted in FIG. 6. However, this is not feasible without the cell descriptor of the present invention since the edges to which the fillets are to be applied are not easily identified. As discussed above, each of the edges has a unique generic name that is based on system logic, and therefore there is no way to reference one or several edges and add a fillet feature on them with a simple script. In order to add the fillets on the upper edges, a cell descriptor is needed. The script set forth above is modified with the addition of the cell descriptor as follows:

```
MyModel isa Model
{
    components:
        P isa Part
        {
    components:
        B is a Box ...
        Pocket1 isa Blind Pocket ...
        Pocket2 isa Blind Pocket ...
        Pocket3 isa Blind Pocket ...
        Pocket4 isa Blind Pocket ...
        Pocket5 isa Blind Pocket ...
        Pocket6 isa Blind Pocket ...
        Fillet 1 isa Fillet
        {
            edges = "{body=<^^P> dim=1 neighbor={dim=2 attribute="UP"}}"
            radius = 5.0
        }
    }
}
```

Here the cell descriptor designates that a fillet of radius 5.0 be placed on the edges specified in the cell descriptor.

It can be seen that the cell descriptor of the present invention allows a user to create an object entirely from a textual script, without reference to a graphical depiction of the object. The user need only visualize the object in his mind, and can write a script creating the object. This feature is yet another example of the way the present invention can increase the productivity of the user.

Cell Descriptor Use in Collaborative Design

Thus, according to the preferred embodiment of the invention, user A performs an action at his workstation. The workstation A system then translates the user action into a command, taking into account the context of the action.

The system executes the command on the model at workstation A and logs the identification of the command and the transaction (the list of events) corresponding to the command, in the transaction journal of the A workstation. The system then sends the identification of the command to all other user workstations registered in the session.

In one embodiment of the invention, users in a collaborative session will have conferred to see whether the use of cell descriptors is necessary. If so, then users who initiate model changes do so using cell descriptors. The cell descriptors are interpreted at the receiving workstations and the command is executed. In another embodiment of the invention, receiving workstations that are not capable of deriving the command from the identification data sent may send a message back to workstation A. In that case, user A may then retransmit the command using cell descriptors. Alternatively, all workstations may store a directory of the other workstations' capabilities regarding the various commands. In such a case, A would be informed of whether to use cell descriptors.

At a receiving workstation B, the command is analyzed in terms of the sequence of feature events it calls for, and the model is then updated.

It can be seen that the system of the present invention is far less sensitive to network or equipment failure than a traditional Client/Server organization. In a Client/Server structure, network or server failures result in the loss of data. In the structure of the invention, each workstation is master of the model so that a network failure or a failure in one of the workstations will only result in ending the session for one or all of the workstations but will not entail any loss of data for the model itself.

Also, the system does not require the transfer of a new version of the model over the network each time a modification is made, as is the case in model-driven systems. It does not even require the transfer of data on geometry differences, only of commands. This considerably limits the amount of data to be exchanged over the network.

The collaboration is fully synchronous in that data can be sent and received by the various workstations at any time and in parallel, not just in turn as it is the case in many so-called "real-time" systems.

It is to be understood that the foregoing method can be applied to any system for designing objects, including any CAD/CAM/CAE/PLM system. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language. The application may be implemented as a local Java application or inside a Web browser.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

The preferred embodiment of the present invention has been described. It will be understood that various modifications may be made without departing from the spirit and scope of the invention. Therefore, other implementations are within the scope of the following claims.

What is claimed is:

1. A computer system operation method for use in a system comprised of a plurality of workstations arranged in a peer-to-peer architecture, said method providing a means for allowing multiple users simultaneously to modify a model of an object at separate workstations, such that any modification made at any workstation is duplicated at each other workstation in the system, the method comprising:
    receiving at a first workstation input from a user specifying a modification of first data comprising a representation of a model of an object, said input comprising one or more constraints relating to cell information;
    upon receipt of the input specifying the modification and under control of the first workstation, translating said input into a model modification command specifying the portion of the first data to be modified, and the modification to be made;
    modifying said first data by said first workstation in accordance with said model modification command to effect a change in the model as represented by said first data;
    substantially concurrent with said modifying of said first data, automatically transmitting said model modification command via a network to other workstations in the system;
    automatically processing said model modification command at a second workstation upon receipt of said model modification command; and
    modifying second data comprising a representation of the model of the object, the second data being automatically modified by the second workstation in accordance with said model modification command to effect the change in the model represented by said second data, said change in the model represented by said second data being made substantially simultaneous with the change in the model represented by said first data;

and wherein said method further comprises:
    a) selecting the first constraint of said input and identifying the components of the CAD system that must be accessed to find geometric cells meeting the requirements of the constraint;
    b) searching the cells of the model and retaining as a subset only the cells that meet the requirement of the first constraint of said input;
    c) selecting the next constraint of said input and identifying the components of the CAD system that must be accessed to find geometric cells meeting the requirements of said next constraint;
    d) searching the subset of cells and retaining in the subset only the cells that meet the requirement of said next constraint of said input; and
    e) repeating steps c) and d) for each of the remaining constraints in said input.

2. The computer system operation method of claim 1, wherein said plurality of workstations each run applications comprising a distributor component, a feature modeler, and a geometric modeler.

3. The computer system operation method of claim 2, wherein said distributor component, feature modeler, and geometric modeler on each of said plurality of workstations are the same.

4. The computer system operation method of claim 3, wherein said geometric modeler on each of said plurality of workstations employs persistent generic naming.

5. The computer system operation method of claim 1, wherein said plurality of workstations each run applications comprising a distributor component, and a feature modeler.

6. The computer system operation method of claim 1, wherein the constraints are chosen from a group comprising:
    a) constraints relating to cell dimension;
    b) constraints relating to the topology of a cell;
    c) constraints relating to the history of the model evolution;
    d) constraints relating to specific attributes of a cell; and
    e) constraints relating to geometrical indications of a cell.

7. The computer system operation method of claim 1, wherein the constraints are chosen from a group comprising:
    a) constraints relating to cell dimension;
    b) constraints relating to the topology of a cell;
    c) constraints relating to the history of the model evolution;
    d) constraints relating to specific attributes of a cell; and
    e) constraints relating to geometrical indications of a cell.

8. A CAD/CAM device comprising:
an input device;
a central processing unit; and
a display device;
wherein the central processing unit runs an application program comprising code for:
    displaying a representation of a model, said representation being generated based on first data associated with said workstation;
    receiving input comprising one or more constraints relating to cell information of the model from a user specifying a modification of the model;
    upon receipt of the input specifying the modification, translating said input into a model modification command specifying the portion of the first data to be modified, and the modification to be made to the first data;
    modifying the first data in accordance with said model modification command to effect a change to the model;

substantially concurrent with said modifying of said first data, automatically transmitting said model modification command via a network to other CAD/CAM devices connected to said network to effect changes to duplicate copies of said first data stored at the other CAD/CAM devices;

for each constraint, determining which cells of the model meet the requirement of the constraint; and generating a list of cells meeting all of the requirements of the constraints.

9. The CAD/CAM apparatus of claim 8, further comprising a distributor component, a feature modeler, and a geometric modeler.

10. The CAD/CAM device of claim 9, wherein said geometric modeler employs persistent generic naming.

11. The CAD/CAM device of claim 8, further comprising a distributor component, and a feature modeler.

12. The CAD/CAM apparatus of claim 8, wherein the application program processes constraints chosen from a group comprising:
  a) constraints relating to cell dimenion;
  b) constraints relating to the topology of a cell;
  c) constraints relating to the history of the model evolution;
  d) constraints relating to specific attributes of a cell; and
  e) constraints relating to geometrical indications of a cell.

13. A CAD system comprised of a plurality of workstations linked together via a communications network, each workstation equipped with program code comprising a distributor component, and a feature modeler, and further comprising program code for causing said workstation to perform a method comprised of:

storing first data representing a model;

receiving input comprising one or more constraints relative to cell information of the model from a user specifying a modification of said model;

translating said input into a model modification command specifying the portion of the first data to be modified, and the modification to be made;

modifying said first data in accordance with said model modification command; and substantially concurrent with said modifying of said first data, transmitting said model modification command via said network to other workstations in the system to instruct said other workstations to modify duplicate copies of said first data so as to maintain a consistent representation of the model by the first data and by the duplicate copies of said first data; and wherein said code further comprises code for;

for each constraint, determining which cells of the model meet the requirement of the constraint; and generating a list of cells meeting all of the requirements of the constraints.

14. The CAD system of claim 13, each workstation further comprising a geometric modeler.

15. The CAD system of claim 14, wherein said geometric modeler employs persistent generic naming.

16. The CAD system of claim 13, wherein the code causes the workstation to process constraints chosen from a group comprising:

a) constraints relating to cell dimension;
b) constraints relating to the topology of a cell;
c) constraints relating to the history of the model evolution;
d) constraints relating to specific attributes of a cell; and
e) constraints relating to geometrical indications of a cell.

17. Computer executable code stored on a computer readable medium, the code comprising means for causing a CAD system to perform a method for:

displaying a representation of a model, said representation being generated from first data comprising a stored representation of the model;

receiving input comprising one or more constraints relating to cell information from a user specifying a modification of the model;

translating said input into a model modification command specifying the portion of the model to be modified, and the modification to be made;

modifying said first data in accordance with said model modification command to effect said model modification; and transmitting said model modification command via a network to other CAD/CAM devices for receipt by a peer CAD system program executing at said other CAD/CAM device to instruct the peer CAD system program to alter a copy of said first data comprising a duplicated stored representation of the model such that real-time synchronization of the model as represented by the first data and as represented by the copy of said first data is maintained;

and the code further comprising means for causing a CAD system to perform a method for:

for each constraint determining which cells of the model meet the requirement of the constraint; and generating a list of cells meeting all of the requirements of the constraints.

18. Computer executable code stored on a computer readable medium according to claim 17, the code further comprising means for causing a CAD system to perform a method for:

receiving from the network a model modification command specifying a portion of the model to be modified, and the modification to be made; and modifying said first data in accordance with said received model modification command to effect a modification to be made.

19. Computer executable code stored on a computer readable medium according to claim 17, wherein said constraints used in said method are chosen from a group comprising:

a) constraints relating to cell dimension;
b) constraints relating to the topology of a cell;
c) constraints relating to the history of the model evolution;
d) constraints relating to specific attributes of a cell; and
e) constraints relating to geometrical indications of a cell.

* * * * *